United States Patent [19]

Nelson

[11] E Patent Number: Re. 32,517

[45] Reissued Date of Patent: Oct. 13, 1987

[54] METHOD AND APPARATUS FOR CLEANING HEATED SURFACES

[75] Inventor: John E. Nelson, Lancaster, Ohio

[73] Assignee: The Babcock & Wilcox Co., New Orleans, La.

[21] Appl. No.: 812,071

[22] Filed: Dec. 23, 1985

Related U.S. Patent Documents

Reissue of:

[64] Patent No.: 3,782,336
Issued: Jan. 1, 1974
Appl. No.: 191,422
Filed: Oct. 21, 1971

U.S. Applications:

[63] Continuation of Ser. No. 353,433, Mar. 1, 1982, abandoned.

[51] Int. Cl.[4] ..... F22B 37/48

[52] U.S. Cl. ..... 122/379; 122/390; 122/392; 15/316 R; 15/317

[58] Field of Search ..... 122/379, 380, 390, 392; 15/316, 317

[56] References Cited

U.S. PATENT DOCUMENTS

| | | | |
|---|---|---|---|
| 2,722,033 | 11/1955 | Glinn et al. | 15/317 |
| 2,883,694 | 4/1959 | Hibner, Jr. et al. | 15/317 |
| 2,932,053 | 4/1960 | McColl | 15/317 |
| 3,230,568 | 1/1966 | Saltz | 15/317 |
| 3,344,459 | 10/1967 | Jankowski | 122/392 |
| 3,377,026 | 4/1968 | DeMart et al. | 15/317 |
| 3,541,999 | 11/1970 | Winkin et al. | 122/392 |
| 3,593,691 | 7/1971 | Wirths et al. | 122/390 |
| 3,782,336 | 1/1974 | Nelson | 122/379 |

FOREIGN PATENT DOCUMENTS

| | | |
|---|---|---|
| D193911 | 1/1908 | Fed. Rep. of Germany . |
| 543593 | 2/1932 | Fed. Rep. of Germany . |
| 608330 | 1/1935 | Fed. Rep. of Germany . |
| 628434 | 4/1936 | Fed. Rep. of Germany . |
| 974165 | 11/1953 | Fed. Rep. of Germany . |
| 789086 | 10/1935 | France . |
| 565110 | 10/1944 | United Kingdom . |
| 596252 | 12/1947 | United Kingdom . |
| 1029668 | 5/1966 | United Kingdom . |

OTHER PUBLICATIONS

East German Magazine, *Energietechnik,* 1954, Reineche, "Cleaning of Slagged Boiler Heating Surfaces during Operation with the Water Jet Method", pp. 26–27.

East German Magazine, *Energietechnik,* 1954, J. Dobreff, H. Effenberger and S. Dauer, "The Spraying of Boiler Heating Surfaces with Water During Operation", pp. 154–158.

East German Magazine, *BKW,* 1949, J. Gloeckner, "Fouling of Convection Surfaces of Stoker Boilers", pp. 233–235.

German Magazine, *Glueckauf,* Dec., 1940, p. 726.

Advertising page in the German Magazine *Energie,* Sep. 1965, Advertiser: The M. Spuhr & Co. Apparatebau-Essen, Germany, Title: "The Revolution in Cleaning of Large Boilers–The Controlled Thermoshock."

Diamond Power Specialty Corporation Memorandum dated 3/5/68 from "Buck" to H. F. Krapf and J. W. Locke.

Letter dated 3/12/68 from W. R. Buckley to H. F. Krapf and attachment thereto.

Letter dated 6/18/68 from D. F. Koonce to W. R. Buckley.

Paper entitled "In-Service Cleaning of Fire-Side Boiler Tube Surfaces with Water Lances" and presented at American Power Conference, Chicago, Illinois on Apr. 20–22, 1971.

Nelson, "Combustion Engineering-Water Blower Performance Tests", Jun. 8, 1970, Report submitted to Combustion Engineering, Inc.

Kappler, *Combustion,* "Slag Deposits on Heat-Absorbing Surfaces and Means for Removal", (Feb. 1940).

*Primary Examiner*—Henry C. Yuen
*Attorney, Agent, or Firm*—Harness, Dickey & Pierce

[57] ABSTRACT

A method and apparatus for deslagging high temperature water walls of boilers while steaming, utilizing a jet of water applied in such manner as to develop sufficient mechanical energy to dislodge the slag without chilling the wall to a harmful degree.

12 Claims, 8 Drawing Figures

FIG. 3A

| Test No. | | $H_1$ | $H_2$ | $H_3$ | $H_4$ | $H_5$ | $V_6$ | $V_7$ | $V_8$ | $V_9$ | $V_{10}$ | |
|---|---|---|---|---|---|---|---|---|---|---|---|---|
| 1 | In | 170 | 90 | 560 | 100 | – | 130 | 130 | – | 75 | 60 | Travel Speed 17"/Min. |
| | Out | 200 | 95 | 560 | 90 | – | 200 | 160 | – | 75 | 60 | #40 Nozzle 282 PSIG |
| 2 | In | 155 | 80 | 300+ | 120 | – | 175 | 175 | – | 95 | 95 | (Clean Wall) Travel Speed |
| | Out | 210 | 90 | 320+ | 120 | – | 190 | 185 | – | 95 | 85 | 17"/Min #40 Nozzle 250 PSIG |
| 3 | In | 155 | 90 | 345 | 120 | – | 185 | 190 | – | 110 | 110 | Travel Speed 17"/Min. |
| | Out | 185 | 95 | 410 | 150 | – | 195 | 180 | – | 95 | 90 | #40 Nozzle 225 PSIG |
| 4 | In | 165 | 80 | 510 | 110 | – | 165 | 180 | – | 110 | 95 | Travel Speed 17"/Min. |
| | Out | 160 | 85 | 510 | 120 | – | 200 | 170 | – | 95 | 80 | #40 Nozzle 150 PSIG |
| 5 | In | 140 | 70 | 560 | 105 | – | 175 | 170 | – | 110 | 100 | Travel Speed 17"/Min. |
| | Out | 150 | 80 | 500 | 110 | – | 185 | 175 | – | 75 | 80 | #40 Nozzle 100 PSIG |
| 6 | In | 160 | 90 | 530 | 140 | – | 160 | 165 | – | 105 | 30 | Travel Speed 17"/Min. |
| | Out | 205 | 90 | 550 | 130 | 30 | 220 | 215 | – | 90 | 30 | #40 Nozzle Press Var. 200-260 PSIG |
| 7 | In | 185 | 100 | 545 | 160 | 55 | 170 | 205 | – | 55 | 95 | (Dirty Wall) Travel Speed |
| | Out | 195 | 90 | 540 | 140 | 65 | 210 | 205 | – | 100 | 90 | 17"/Min. #40 Nozzle 250 PSIG |
| 8 | In | 285 | 170 | 570 | 285 | 115 | 530 | 350 | – | 210 | 205 | Travel Speed 7 3/16"/Min. |
| | Out | 300 | 200 | 580 | 310 | 95 | 450 | 345 | – | 200 | 130 | #40 Nozzle 260 PSIG |
| 9 | In | 205 | 95 | 560 | 225 | 140 | 240 | 260 | – | 160 | 130 | Travel Speed 14"/Min. |
| | Out | 260 | 110 | 560 | 230 | 125 | 245 | 230 | – | 120 | 130 | #40 Nozzle 225 PSIG |
| 10 | In | 155 | 75 | 545 | 170 | 120 | 200 | 190 | – | 165 | 110 | Travel Speed 28 1/2"/Min. |
| | Out | 170 | 85 | 540 | 175 | 95 | 205 | 185 | – | 95 | 85 | #40 Nozzle 285 PSIG |
| 11 | In | 110 | 70 | 285 | 85 | 95 | 135 | 125 | – | 65 | 65 | Travel Speed 47 1/2"/Min. |
| | Out | 120 | 70 | 350 | 100 | 80 | 155 | 160 | – | 55 | 60 | #40 Nozzle 295 PSIG |
| 12 | In | 40 | 100 | 520 | 75 | 20 | 60 | 55 | – | 30 | 20 | Variable Speed |
| | Out | 70 | 30 | 150 | 50 | 50 | 55 | 30 | – | 20 | 20 | #40 Nozzle |
| 13 | In | 85 | 55 | 200 | 70 | 80 | 105 | 100 | – | 70 | 90 | Variable Speed |
| | Out | 80 | 45 | 260 | 60 | 70 | 110 | 185 | – | 40 | 80 | #40 Nozzle 280 PSIG |
| 14 | In | 160 | 110 | 460 | 180 | 105 | 190 | 145 | – | 85 | 75 | Travel 18"/Min. |
| | Out | 205 | 165 | 490 | 190 | 105 | 190 | 155 | – | 75 | 60 | #40 Nozzle 250 PSIG |

FIG. 3B

| | | | | | | | | | | | | |
|---|---|---|---|---|---|---|---|---|---|---|---|---|
| 15 | In | 135 | 180 | 530 | 220 | 115 | 105 | 205 | — | 120 | 95 | Travel 18"/Min. |
| | Out | 255 | 180 | 525 | 215 | 110 | 210 | 190 | — | 95 | 105 | #20 Nozzle 150 PSIG |
| 16 | In | 190 | 190 EST | 530 | 230 | 160 | 155 | 155 | — | 85 | 110 | Travel 18"/Min. |
| | Out | 205 | 100 | 505 | 235 | 105 | 130 | 180 | — | 115 | 110 | #20 Nozzle 100 PSIG |
| 17 | In | 220 | 125 | 530 | 230 | 125 | 200 | 220 | — | 125 | 115 | Travel 18"/Min. |
| | Out | 235 | 150 EST | 535 | 255 | 125 | 205 | 200 | — | 90 | 115 | #20 Nozzle 200 PSIG |
| 18 | In | 235 | 135 | 540 | 150 | 120 | 195 | 250 | — | 100 | 110 | Travel 18"/Min. |
| | Out | 210 | | 540 | 210 | 120 | 185 | 205 | — | 100 | 140 | #20 Nozzle 215 PSIG |
| 19 | In | 145 | 90 | 540 | 165 | 110 | 150 | 175 | — | 90 | 110 | Travel 18"/Min. |
| | Out | 150 | 100 | 540 | 155 | 115 | 145 | 175 | — | 75 | 85 | #20 Nozzle 310 PSIG |
| 20 | In | 135 | 100 | 540 | 165 | 95 | 160 | 130 | — | 90 | 95 | Travel 18"/Min. |
| | Out | 140 | 135 | 540 | 170 | 100 | 160 | 140 | — | 75 | 80 | #20 Nozzle 325 PSIG |
| 21 | In | 80 | — | 110 | 0 | — | 35 | 30 | — | 30 | 55 | Variable (Dirty Wall) |
| | Out | 85 | — | 235 | 50 | — | 70 | 70 | — | 25 | 30 | #40 Nozzle 270 PSIG |
| 22 | In | 95 | — | 255 | 130 | — | 70 | 70 | — | 50 | 40 | Variable (Clean Wall) |
| | Out | 100 | — | 250 | 100 | — | 85 | 100 | — | 50 | 35 | #40 Nozzle 280 PSIG |
| 23 | In | 90 | — | 290 | 110 | 35 | 70 | 65 | — | 35 | 45 | Variable (Clean Wall) |
| | Out | 100 | — | 290 | 105 | 40 | 95 | 80 | — | 30 | 50 | #40 Nozzle 200 PSIG |
| 24 | In | 65 | 30? | 35 | 50 | 40 | 40 | 10 | — | 25 | 30 | Variable (Clean Wall) |
| | Out | 75 | 20? | 360 | 25 | 35 | 30 | 20 | — | 10 | 10 | #40 Nozzle 100 PSIG |
| 25 | In | 100 | — | 300 | 160 | 70 | 100 | 35 | — | 40 | 50 | Variable (Clean Wall) |
| | Out | 115 | — | 400 | 155 | 90 | 115 | 30 | — | 20 | 45 | #30 Nozzle 205 PSIG |
| 26 | In | 80 | — | 160 | 95 | 80 | 65 | 60 | — | 55 | 80 | Variable (Clean Wall) |
| | Out | 80 | — | 210 | 115 | 60 | 80 | 75 | — | 40 | 45 | #30 Nozzle 290 PSIG |
| 27 | In | 60 | — | 510 | 95 | 105 | 100 | 55 | — | 50 | 80 | Variable (Clean Wall) |
| | Out | 85 | — | 280 | 85 | 60 | 110 | 100 | — | 45 | 90 | #60 Nozzle 240 PSIG |
| 28 | In | 80 | — | 190 | 90 | 70 | 75 | 90 | — | 60 | 70 | Variable (Clean Wall) |
| | Out | 100 | — | 190 | 100 | 75 | 80 | 75 | — | 50 | 60 | #40 Nozzle 200 PSIG |

METHOD AND APPARATUS FOR CLEANING HEATED SURFACES

Matter enclosed in heavy brackets [ ] appears in the original patent but forms no part of this reissue specification; matter printed in italics indicates the additions made by reissue.

*This is a continuation of application Ser. No. 353,433, filed Mar. 1, 1982, now abandoned.*

BACKGROUND OF THE INVENTION

Cleaning highly heated surfaces such as the outsides of the tubes of water tube boilers and the like has commonly been performed by soot blowers employing steam, air, or a combination of steam and air as the blowing medium. The dislodging of deposits of slag and other fouling materials has become increasingly difficult as the operating temperatures of boilers have increased and the use of fuels of lower quality has become more common.

It has long been known that the use of water, either alone or in combination with a gaseous blowing medium, can increase the ability to dislodge highly adherent deposits, and water has been so used both in soot blowers and in hand lances. It has generally been considered that the effectiveness of water for this purpose is dependent upon a thermal shock effect, which, by tending to shrink and embrittle the deposit, results in fracturing the same so that it will fall or may more easily be dislodged. In order to obtain a sufficient cleaning effect by the use of water in accordance with this previously accepted theory, the danger of overstressing the hot surfaces was substantial, and in fact rapid deterioration of boiler tubes by thermal shock has frequently been caused by such use of water.

The problem is particularly severe in connection with cleaning the water walls in the combustion chambers of large boilers, where the tubes are quite rigidly held in position, and therefore cannot distort in response to temperature induced shrinkage and expansion tendencies as readily as can the pendent tubes. One method of attempting to control thermal shock while utilizing water for boiler cleaning has involved throttling the water supply in such manner that the actual amount of water striking different areas of the tubes will be substantially constant. Where, for example, a water wall surface is to be cleaned by a retracting-type blower which projects a jet in a spiral path against a water wall surface, this former practice would dictate reducing the rate of water flow from the jet, while it is discharing against surfaces closer to the nozzle, to a value lower than that used while it is discharging against surfaces farther from the nozzle, so that the amount of water striking each incremental area of uniform size will be rendered more uniform, the theory being that thermal shock would correspondingly be held within predetermined limits.

Essentially, therefore, prior attempts to utilize water and acqueous solutions to assist in dislodging slag and the like were based upon an unreliable equating of thermal shock with cleaning, from which it often appeared necessary to utilize, or permit, such a high degree of thermal shock, to dislodge the slag, that damaging the tubes was unavoidable. It follows from this that in a great many instances water simply could not be used, because the volume required to dislodge the slag by such methods of operation would damage the tubes. In other instances some damage and shortened tube life have been tolerated in the interests of maintaining streaming rates under difficult cleaning conditions. Disclosures representative of prior thinking are contained in U.S. Pat. Nos, 1,840,545 of Jan. 12, 1932 and 3,344,459 granted Oct. 3, 1967.

By careful field observations and tests, however, I have determined that effective cleaning of slag from boiler surfaces can be achieved while holding thermal shock far below values which would damage the tubes, and that in fact, by practicing my improved method, slag removal can be rendered virtually independent of thermal shock.

The overall objective of the present invention, therefore, is to provide a method and apparatus whereby highly adherent deposits such as slag can be removed from hot surfaces with the aid of water with minimized thermal shock and in a manner which prevents damaging the surfaces.

Other objects and advantages will become apparent upon consideration of the present disclosure in its entirety.

BRIEF DESCRIPTION OF THE FIGURES OF DRAWING

Figure 1:
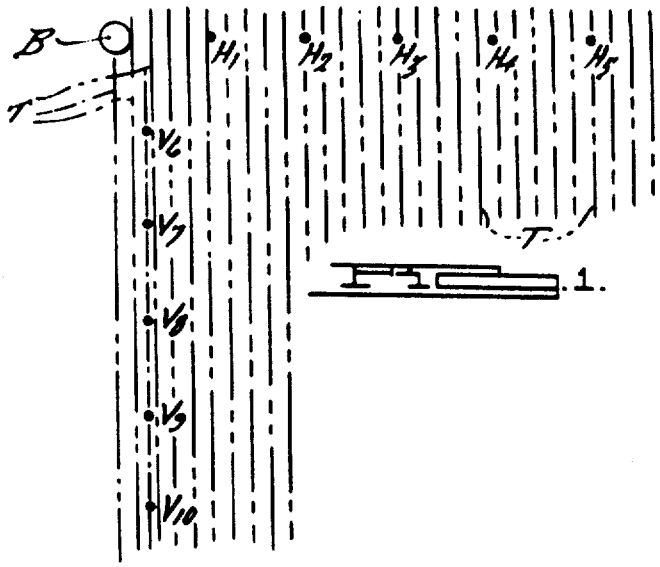
FIG. 1 is a diagrammatic view corresponding to a fragmentary elevation of the water wall of a large fossil fuel boiler, showing the positioning of a water blower and a group of thermocouples as used in a test of this invention.

FIGS. 3A and 3B comprise a chart showing the results of comparative tests of the invention and of prior known methods; and FIGS. 4–7 inclusive are graphs depicting results of the tests and containing comparative showings of significant factors.

DETAILED DISCLOSURE OF PREFERRED EMBODIMENT OF THE INVENTION

In practicing my invention I provide a water jet which is so proportioned and which is so moved along the heated surfaces impinged thereby that the mechanical energy of impinging droplets of water is sufficient to dislodge the fouling material, but the thermal shock effect is reduced to a very low value which will minimize harm to the tubes.

The principal cause of thermal shock in the use of water against boiler surfaces is the latent heat of vaporization of the portion of the water which boils while in contact with the tubes. I have found that water projected against the tubes from a distance of several feet, even in the highly heated water wall areas in the furnace section of large public utility boilers, will, if the jet is relatively small in size, high in velocity and moved quite rapidly over the surface, while being projected thereagainst at a suitable angle, strike the tubes in the form of droplets, and then tend to bounce off the tubes with little wetting of the tubes and greatly minimized evaporation while in contact therewith. If on the other hand former practices are followed in which a relatively large volume of water is projected against the tubes from a slow moving jet of large diameter, the water will boil while in contact with the tubes to a greater extent, because with such practices the jet tends to flatten, spread and even run down the tubes. High thermal shock is therefore caused. Such cooling of the slag deposits also has a tendency to harden the deposits and to render them more difficult to dislodge, so that the process is to a degree self-defeating.

I have also found that the angle at which the jets strike the slag has an effect upon the efficiency of slag removal. In the high temperature zones, where the slag is quite plastic, the tendency of the jet to peel the slag from the tubes—somewhat analogous to the effect of "peeling" wet snow from a sidewalk with a snow shovel—can improve the operation, although this does not affect the fundamental principles of my invention, and the preferred angle of jets will vary somewhat with the conditions of temperature and the composition of the fouling materials. The optimum jet characteristics and speed of jet movement which will perform the most efficient cleaning will also vary with such factors, but from the above explanation I believe it will be evident that for any given condition a jet of small diameter and high velocity, applied at an efficient angle, will perform efficient cleaning of slag-like deposits when moved along the surface to be cleaned at a relatively high minimum speed which is fast enough so that the amount of water vaporized against the tubes does not cause chilling to an extent which will create damaging thermal shock.

Where low water pressure is used in such a jet, the tendency of the water to run down the tube rather than bouncing off is increased, so that thermal shock and stress are higher. This tendency is also affected by the angle that the jet strikes the wall. In one test operation, a twenty degree angle provided highly effective cleaning with minimum shock effect when the other factors referred to were properly adjusted. The temperature of the water employed made very little difference in the operation. The tests were conducted with water at a temperature of from 70° to 150°, with no material difference in the effect. In both instances the water jet broke into droplets which struck and bounced off the tubes after passing through hot gas for a distance of six feet in the combustion chamber, which was at a temperature of approximately 2,400° F. In fact droplets of the deflected spray were projected out through an open observation door in substantial quantities, striking the test personnel, without burning the skin.

I have also found that cleaning by my method can be effectively performed with a single jet. In the past it has been considered necessary to use two nozzles, in the performance of water cleaning, upon the incorrect theory that the two nozzle passes thus provided over each area were necessary so that the first jet could pre-cool and shrink the slag and so prepare it for removal by the second jet. With my method, two nozzles can be used, and this provides a safety factor in case one nozzle becomes plugged by dislodged slag, but if two nozzles are used they are, as indicated above, of small size, high velocity, and moved so rapidly that harmful shock is not caused.

With my method it is also possible to clean the tubes so thoroughly that the jet not only removes slag, but also removes scale from the tubes, leaving the bare metal. A bare metal tube is much more resistant to the build-up of slag than a scaled tube.

The water pressure has little effect on thermal shock, so long as the jet velocity and rate of travel are high enough and the jet diameter and volume of water are low enough. Pressures from 50 psi to 200 psi have been utilized with success.

A report of tests of this invention conducted during July and Aug. of 1971 will be given for the purpose of disclosing the findings and the best techniques known to date for practicing the invention, although it will be recognized that the parameters might be expected to vary under different conditions of boiler construction, operating temperatures, fuel, etc.

The boiler was a large public utility boiler having a membrane-type water wall, burning powdered North Dakota lignite. The water was projected against the water wall by a short retracting blower of the IK type having a pair of straight round-orificed nozzles. The diameters of the nozzle orifices were changed in certain of the tests. The blower was of the single motor type with a fixed ratio of rotation to translation (approximately 180° per inch of translation). The blower traveled 41 inches into the boiler, while rotating and directing the jet back against the wall at an angle of approximately 20° to the wall surface. The path of jet impingement during its inward movement into the boiler was therefore a spiral of increasing diameter, and a reverse spiral of decreasing diameter during retraction.

Figure 2:
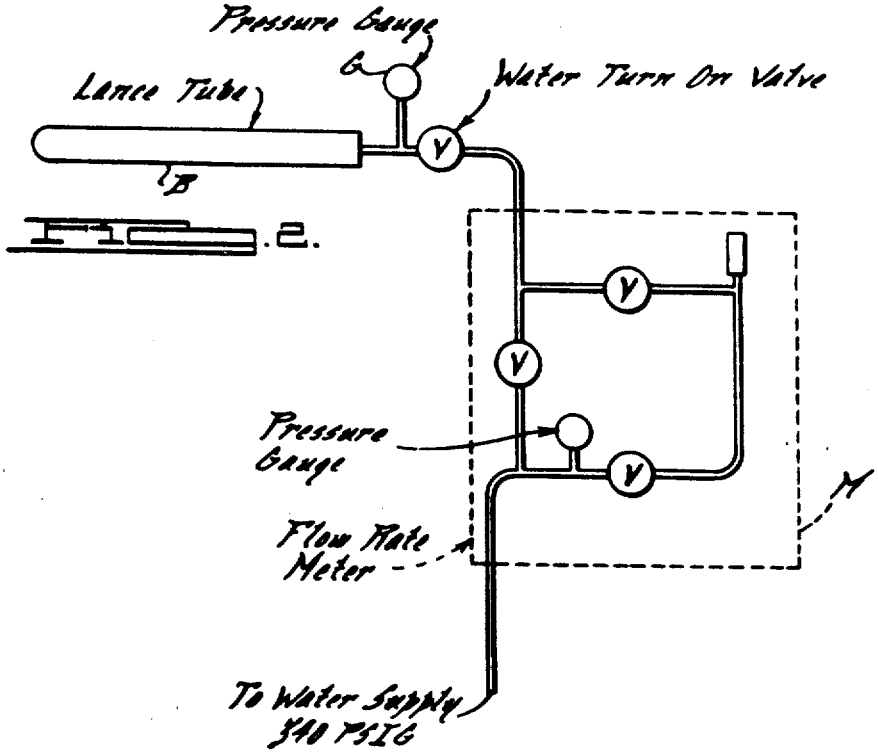
FIG. 2 is a schematic diagram of the water control system of the cleaning apparatus of FIG. 1.

FIG. 1 corresponds to a diagrammatic elevation of a portion of the water wall of the boiler used in the test. The tubes, which are diagrammatically indicated by the broken lines "T," extend vertically, and are 2¾ inch OD on 3½ inch centers, connected by membranes. FIG. 1 shows the relative positioning of the blower and ten thermocouples which were installed on the furnace wall to monitor the thermal shock on the tubes produced by the water jets. As indicated in FIG. 1, these consisted of five thermocouples, H1–H5 inclusive, on a horizontal center line from the blower, H1 being spaced 17 inches from the blower, and the others 14 inches, apart, and five thermocouples, V6–V10 inclusive, in a vertical row and spaced approximately similarly from the blower. The blower and its control mechanism were rebuilt in such a manner that it could be operated either at a constant rotational and translational speed, in the conventional manner, or at a variable speed, by replacing the AC motor and gear reducer with a DC motor with a DC variable speed control to produce desired motor speed. A flow rate meter, M, FIG. 2, was used to monitor the water flow in gallons per minute for each test, and a pressure gauge G connected to the stationary feed tube of the blower was installed to monitor the pressure of the blowing medium.

Figure 4:
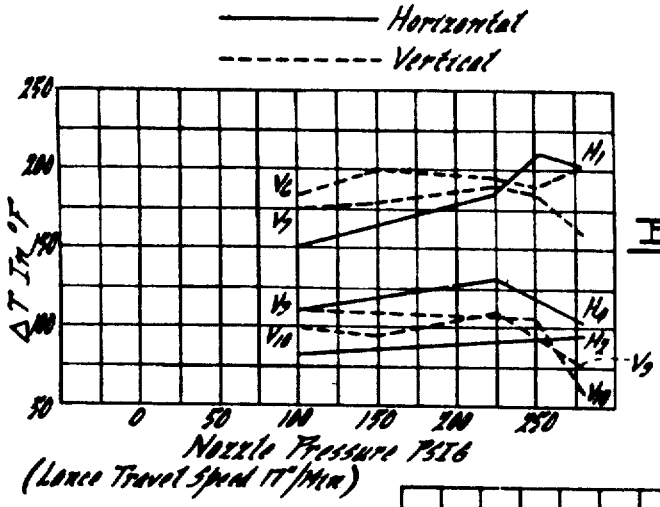

Several tests were first run with the blower operating in a normal manner, that is, at a constant rotational and translational speed, discharging water through No. 40 nozzles (5/32 inch diameter orifices) at various water pressures which are indicated along the abscissa in FIG. 4. Under such conditions of constant blower speed, since the angular rate of rotation is constant, the rate of linear travel of the point of impingement of the jet with the surface of the wall is much slower in the smaller areas of the spiral, where the jet is close to the wall, and is very much faster near the maximum spiral diameters, when the nozzle is near full penetration. The data taken during these initial runs are not contained in FIGS. 3A and 3B, but the results thereof graphed in FIG. 4 show not only the decreased thermal shock at positions farther from the blower axis, where the linear rate of travel of the point of jet impact was higher, but also that no significant change occurs throughout a wide variation of nozzle pressure.

FIG. 3 tabulates the readings of subsequent test operations performed with the above apparatus, with the boiler operating normally, and with changes made to test the theory of this invention. The furnace temperatures in the regions of the thermocouples were in the region of 2,400° F. The recordings in FIG. 3 show, in degrees F, the maximum temperature drop, as indicated at each thermocouple station as a result of the cooling effect of the water.

Figure 5:
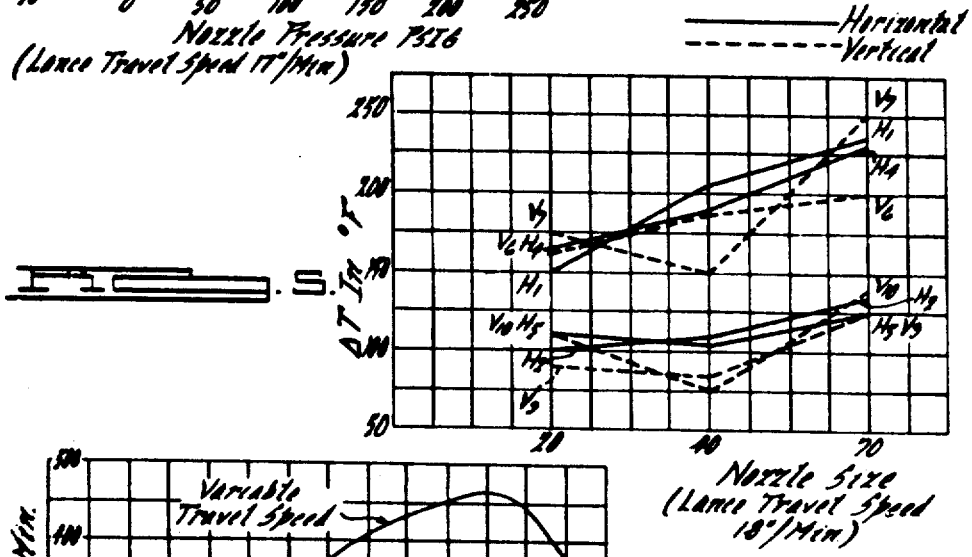
Figure 7:
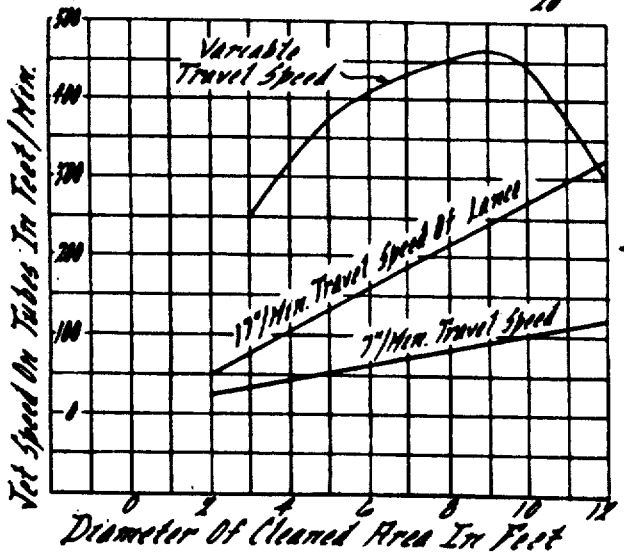
Figure 6:
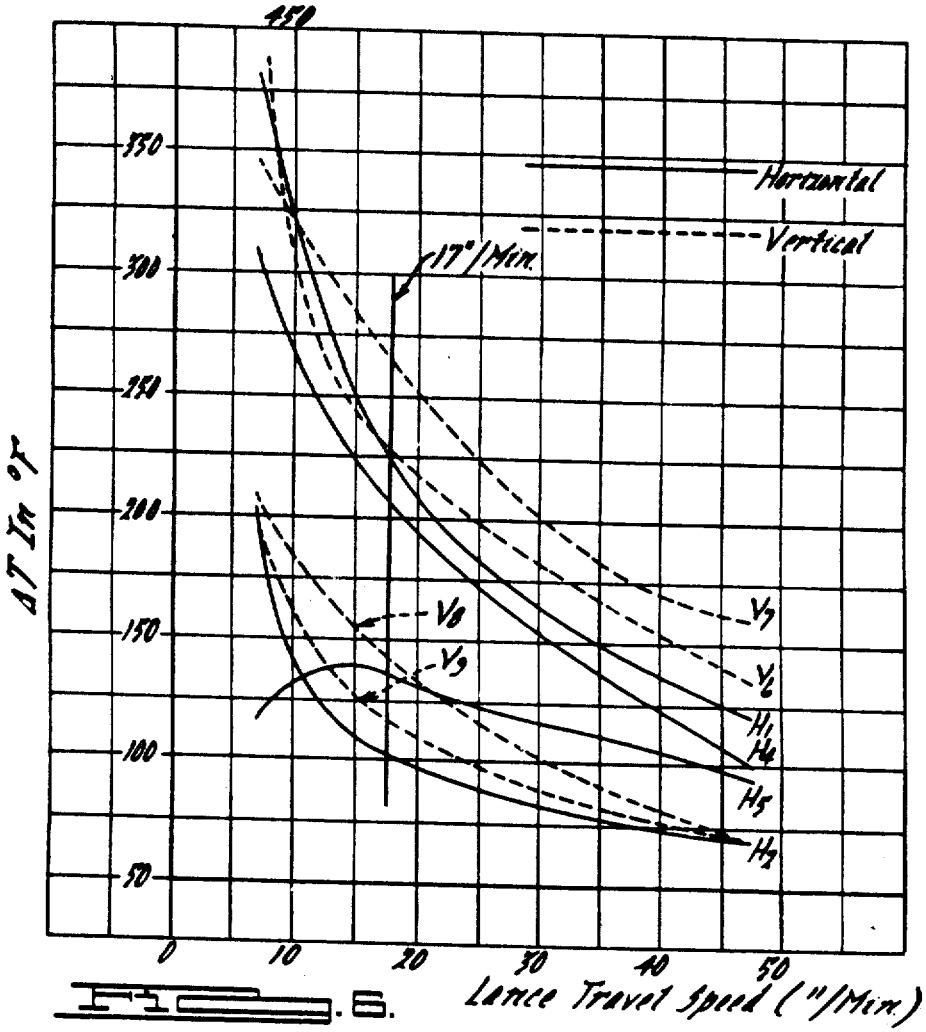

The charts, FIGS. 3A and 3B, containing the readings used in preparing FIGS. 5–7, are furnished for the purpose of showing the aberrations which may assist those skilled in the art to make an independent evaluation.

In further explanation of the aberrations, it may be noted that at the start of the tests a heavy slag formation existed at the $H_5$ thermocouple location, which was at the outer limit of the cleaning radius of the water lance. The $H_2$ thermocouple became defective after the 20th test. Thermocouple $H_3$ was obviously defective. It could not be repaired, because the boiler was on the line; and the reason for its defective operation cannot yet be determined, since the boiler is expected to remain on the line for at least several months. The $H_3$ readings should therefore be ignored. Thermocouple $H_4$, for reasons unknown, gave consistently higher readings than $H_2$. Some of the other readings were questionable and some were approximated. Such entries, however, are marked "Est." and "?." Such defects are to be expected due to such conditions as the sensitivity and rapid response of the instrumentation which sometimes caused rapid swings, the turbulence and flow patterns in the furnace chamber, etc. Such factors in some instances prevented any readings at all. Accurate temperature determinations are in fact almost impossible to obtain in this type of installation, but sufficient readings were obtained to indicate the effect and significance of the factors in question on thermal shock and it will be seen that each operating thermocouple, regardless of such aberrations, consistently showed sharp reduction of thermal shock in response to increased speed of travel of the jet over the wall.

Moreover, it was found by observation that effective cleaning of adherent slag could be achieved, at low thermal shock, using water at a temperature of about 70° F. (although water temperature is not critical) projected from No. 40 nozzles at pressures between 150 and 200 psig while moving the jet over the surface at 250–350 feet per minute.

Tests 1–7 inclusive were made with the motor driving the blower at a constant speed corresponding to 17 inches per minute inward travel, which corresponds to a rotational speed of approximately 8.5 rpm. The only factor which was changed in tests 1–7 was the water pressure. Similarly, in tests 15–18, the nozzle size and rate of drive were held constant and the blowing pressure was changed. The figures entered on the chart indicate the maximum temperature drop, in degrees Fahrenheit, caused by the jet. It will be seen that this did not change significantly at the several thermocouple stations in response to changes of blowing pressure.

FIGS. 5–7 show significant aspects of the readings in graphic form.

FIG. 5 shows the effects on thermal shock (temperature drop in degrees F.) created by changing nozzle sizes. (No. 20=7/64 inch dia., No. 30=9/64 inch dia., No. 40=5/32 inch dia., No. 60=3/16 inch dia., No. 70=13/64 inch dia.) It will be seen that an increase of nozzle size increases thermal shock. Since the actual dwell time of the water on the tube wall surface is believed by me to be the factor controlling shock, this was to be expected. In this connection it will be appreciated that with conventional (constant rotational speed) blower operation, as in tests 1–11 and 15–20, the dwell time is less, due to its more rapid linear travel, as the jet, in its outward spiral movement from the center location, reaches the areas of the thermocouples shown in FIG. 1 which have the higher numbers. Conversely, during its travel in the areas of thermocouples closer to the blower, the travel is slower and dwell time longer, and as clearly shown in the charting, the thermal shock is correspondingly higher. Although the performance of thermocouples is not as reliable as might be desired, and the instrumentation involved difficulties, as noted, so that the temperature drop indications cannot all be rigorously correct, they significantly support the conclusions stated, being sufficiently consistent within themselves in the respects indicated when allowances are made for the fact that thermocouple V8 was dead, and the performance of others was defective. The number of proper readings clearly shows the controllability of shock which is possible by adjusting the factors referred to in such manner as to increase the mechanical efficiency of the jet in proportion to the dwell time of the water on the hot surfaces.

FIG. 6 shows the relationship of thermal shock (temperature drop) to the rate of linear travel of the jet over the wall surface. In this chart the abscissa indicates the rate of travel of the lance tube into and out of the boiler, so that the linear velocity of jet travel on the wall was a function of radius (thermocouple position) as well as lance travel speed, but the sharp rate of decrease of temperature drop ($\Delta T$) in proportion to the increase of linear jet travel rate is clearly reflected.

Tests 12, 13 and 21–28 inclusive (FIG. 3) were made with the variable speed apparatus above referred to, used in such manner that it was intended to maintain the rate of linear travel of the jet over the wall surface constant, by controlling the speed of the driving motor of the blower. However, due to a failure of an electrical component in the control system, it was not possible to hold the speed fully constant during these tests. The actual speed pattern of the jet was as shown by the top curve on FIG. 7. By reason of the fact that this speed did vary, in the manner shown in FIG. 7, it is clear that the results are less favorable than would have been obtainable if a flat horizontal (constant speed) curve could have been attained. Despite this countervailing factor it will be seen that the tests clearly and successfully demonstrate that by maintaining the linear speed at a relatively high value in the regions near the blower axis, as compared with the normal practice shown on the two lower curves, the shock was greatly reduced, and prevented from reaching the undesirable values reached previously.

In practicing this invention the parameters are adjusted so as to apply the mechanical energy of the water to the fouled surfaces as efficiently as possible with minimized thermal shock. As indicated above, the jet of water, when applied as desribed, breaks up into droplets before striking the tubes. In the above tests, using No. 40 nozzles and pressures in the range of 100–325 psig, the droplets continued in a jet of small diameter to the point of impact. The maximum diameter of the jet was relatively small compared to the diameter of the tubes and appeared to be about ¾ inch. A substantial proportion of the water bounded off the tubes and membranes. The effects of the interrupted impacts resulting from the momentum of the individual droplets, and the periodicity and impacts resulting from the successive manner in which the rapidly moving jets strike the tubes, all seem to tend to maximize the ratio of mechanical efficiency to the quantity of water which remains on the hot surfaces long enough to boil while in contact therewith. The efficiency in this regard is also aided, at least with some kinds of fouling materials, by controlling the angle of impact, as previously mentioned, so that the momentum of the water is used with a high ratio of mechanical efficiency to thermal shock, and in practice the jet is moved over the surfaces as rapidly as is possible while still achieving effective cleaning. I have found that it is not necessary to drop the speed to a speed low enough to cause harmful shock if these principles are followed.

Utilizing this technique upon a heavily slagged surface, it was found that the areas close to the center and all the way out to the maximum diameter could be thoroughly deslagged and descaled while keeping thermal shock at a very low and safe level.

The slag formations dealt within the tests reported herein were quite apparently removed principally by mechanical force. Since the composition and viscosity of slag, and other conditions, may vary widely, it will be appreciated that if conditions not now known to me should exist which would make thermal shock an important factor in slag removal, the actual amount of thermal shock imposed on the slagged surfaces can be accurately controlled and kept within safe limits by the technique disclosed herein involving constantly maintaining the speed of travel of the jet at a value high enough to prevent an undesirably high degree of shock while permitting any lesser degree of shock which might be desired.

This Detailed Description of Preferred Form of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. The method of utilizing a liquid jet to dislodge deposits from hot surfaces which comprises providing a *rotating* jet of a relatively small diameter and projecting the jet at a high velocity of propagation which will possess sufficient mechanical energy to effect physical dislodgment of deposits, and directing the jet against [such a surface] *said hot surfaces* while and only while [moving] *continuously varying the rate of rotation of the jet in proportion to the distance of travel of said jet so as to move* the jet over the surface at a speed of progression thereover which is sufficient to prevent chilling any part of the surface to an extent causing undesirable thermal shock.

2. The method set forth in claim 1 wherein a mechanically-operated soot-blower-type liquid projecting device has an angularly movable nozzle which is employed to project the liquid against hot surfaces which are spaced at variant distances from the nozzle, and the rate of angular movement of the nozzle is increased when the jet is directed against surfaces closer to the nozzle, and vice-versa.

3. A method according to claim 2 wherein said jet characteristics and the rate of linear displacement of the point of impingement of the jet with the surface are maintained substantially constant.

4. Apparatus for deslagging water walls and the like comprising a water projector of the rotary retracting soot blower type, and continuously variable speed controlling means for changing the rate of rotation thereof *in proportion to the distance the soot blower extends into the boiler whereby the speed of progression of the fluid along said water walls may be maintained relatively constant.*

5. The method of dislodging deposits from surfaces located in a high temperature zone which comprises providing a *rotatably* movable nozzled liquid jet-forming member for discharging a liquid which is vaporizable at the temperature existing in the zone, projecting the liquid from such member against such surfaces from [variant] *varying* distances in the form of a substantially uniform concentrated high velocity jet, all such distances being such that liquid strikes the surfaces in unvaporized form, and *continuously* varying the rate of movement of the jet *in proportion to said varying distances* while maintaining the jet characteristics at such substantially uniform concentrated high velocity form, in such manner as to compensate for differences in the [angularity] *distances* between the jet and the surfaces impinged thereby to maintain the rate of travel of the point of impingement of the jet *against said surfaces* at a value substantially higher than a rate which would wet the surface sufficiently to materially chill the same.

6. The method of dislodging deposits from hot surfaces located in a high temperature atmosphere by means of a jet of a liquid which boils at a temperature lower than the temperatures of the atmosphere and of the surfaces, which comprises adjusting the diameter, velocity and duration of impact of the jet to values tending to minimize the amount of cooling effect in proportion to the effective mechanical force exerted upon the surface deposits *and continuously varying the speed of movement of the device from which said jet is projected against said surfaces in proportion to the distance between said surfaces and said device whereby the speed of progression of said jet across said surfaces is maintained relatively constant.*

7. A method according to claim 6 which include directing the jet against the deposits at an angle tending to peel the same from the surfaces.

8. A method according to claim 6 in which the duration of impact is controlled by moving the jet over the surface at a linear speed exceeding a predetermined minimum.

9. A method according to claim 6 in which the liquid is projected against the surfaces in a discontinuous stream.

10. A method according to claim 1 wherein the jet is moved over the surface at or somewhat below the maximum linear speed which is effective to achieve the desired cleaning.

11. A method according to claim 6 for use against tubular surfaces and wherein the jet diameter is substantially less than the tube diameter.

12. A method according to claim 6 for use against tubular surfaces and wherein the jet diameter is substantially less than the tube diameter and the velocity of propagation and duration and angle of impact are such as to cause a substantial proportion of the liquid to bounce off of such surfaces.

* * * * *